United States Patent [19]

Böckstiegel et al.

[11] Patent Number: 4,957,632
[45] Date of Patent: Sep. 18, 1990

[54] VALVE CLOSING DEVICE FOR A FILTER VESSEL IN A BEVERAGE MAKER

[75] Inventors: Jürgen Böckstiegel; Dieter Brindöpke, both of Minden; Peter Ullrich, Rahden, all of Fed. Rep. of Germany

[73] Assignee: Melitta-Werke Bentz & Sohn, Minden, Fed. Rep. of Germany

[21] Appl. No.: 247,272

[22] Filed: Sep. 21, 1988

[30] Foreign Application Priority Data

Sep. 21, 1987 [DE] Fed. Rep. of Germany ... 8712709[U]

[51] Int. Cl.$^5$ ............................................. B01D 29/085
[52] U.S. Cl. .................................... 210/248; 210/465; 210/469; 210/470; 210/474; 210/497.3; 222/441; 206/0.5
[58] Field of Search ............... 222/108, 110, 306, 434, 222/460, 470, 441; 426/77, 80, 82; 206/0.5; 210/248, 465, 469, 470, 473, 474, 477, 478, 479, 480, 481, 482, 497.01, 497.3

[56] References Cited

U.S. PATENT DOCUMENTS

| | | | |
|---|---|---|---|
| 778,695 | 12/1904 | McEwen | 210/473 |
| 892,000 | 6/1908 | MacKaskie | 210/497.3 |
| 1,003,410 | 9/1911 | Arnesen | 210/470 |
| 1,053,316 | 2/1913 | Psikal | 222/441 |
| 1,066,788 | 7/1913 | Bowen | 210/470 |
| 1,073,081 | 9/1913 | Jacobsen | 210/465 |
| 1,073,164 | 9/1913 | Parkin | 210/248 |
| 1,361,146 | 12/1920 | Egnataff | 222/441 |
| 1,607,530 | 11/1926 | Guest | 222/441 |
| 2,836,300 | 5/1958 | Serr | 210/474 |
| 4,031,032 | 6/1977 | Jablecki | 210/474 |

*Primary Examiner*—W. Gary Jones
*Assistant Examiner*—Wanda L. Millard
*Attorney, Agent, or Firm*—Spencer & Frank

[57] ABSTRACT

A filter vessel including a vessel body having a bottom outlet opening; a carrying handle mounted on the vessel body; a closing rod extending alongside the vessel body and being longitudinally movably supported thereby between first and second positions; a valve mounted on the closing rod for maintaining the outlet opening open or closed in the respective first or second position of the closing rod; a spring urging the closing rod into the first position; an engagement face carried on the closing rod; an operating lever pivotally supported by the vessel body in an upper zone of the carrying handle and having a depressed position and a raised position; and a clamping cam carried by the operating lever. The clamping cam is in contact with the engagement face and displaces the closing rod toward the second position upon manual movement of the operating lever into the depressed position.

10 Claims, 4 Drawing Sheets

VALVE CLOSING DEVICE FOR A FILTER VESSEL IN A BEVERAGE MAKER

BACKGROUND OF THE INVENTION

1. Field of the Invention

The present invention relates to a filter vessel made of synthetic material for the production of aromatic extracts from coffee or tea. The filter vessel comprises a generally frustoconical housing or inverted pyramid-shaped housing having an outlet opening in the bottom and a carrying handle attached to its exterior. The filter vessel also includes a valve closing device for the outlet opening. The valve closing device comprises a longitudinally displaceable closing rod that is guided in a groove molded within the interior wall of the housing and is movable by means of an operating device located in the upper end region of the carrying handle.

2. Discussion of the Prior Art

The above described type of filter vessels are known in the art. Conventionally, the operating device and closing rod form one unit such that the components required for operating the closing rod are integrally molded to the closing rod.

While such an arrangement ensures a simple assembly of the closing rod and the operating device in the filter vessel, it has been found that the practical manipulation of the operating device is unsatisfactory because the thumb must be used to move the closing rod into the closed position and the index finger must be used to remove it from the closed position. Further, only close inspection reveals the actual position of the closing rod.

Therefore there is a need for a filter vessel which has a valve closing device that can be simply operated and can also indicate to the user whether the outlet opening is closed or open.

SUMMARY OF THE INVENTION

It is an object of the present invention to provide an improved filter vessel of the aforementioned type which significantly simplifies manipulation of the closing rod for the user and which gives a clear visual indication whether the vessel outlet is open or closed.

These objects and others to become apparent as the specification progresses, are accomplished by the invention, according to which, briefly stated, the filter vessel includes a vessel body having a bottom outlet opening; a carrying handle mounted on the vessel body; a closing rod extending alongside the vessel body and being longitudinally movably supported thereby between first and second positions; a valve mounted on the closing rod for maintaining the outlet opening open or closed in the respective first or second position of the closing rod; a spring urging the closing rod into the first position; an engagement face carried on the closing rod; an operating lever pivotally supported by the vessel body in an upper zone of the carrying handle and having a depressed position and a raised position; and a clamping cam carried by the operating lever. The clamping cam is in contact with the engagement face and displaces the closing rod towards the second position upon manual movement of the operating lever into the depressed position.

The construction according to the invention facilitates actuation of the closing rod considerably insofar as it only requires manipulation of the operating lever. Actuating the operating lever for opening, as well as for closing the filter vessel, can therefore be exclusively effected with the thumb of the user's hand which grasps the handle. When the operating lever of the filter vessel is pressed downwardly to close the outlet opening, the cam surface on the operating lever displaces the closing rod and thus the closing plug at the end of the closing rod into the closed position and, at the same time, the spring member, which may include an arm of the closing rod is stressed. The cam surface has an appropriately flattened part to maintain the closing rod in the closed position against the force of the spring member even after the manual force is removed from the operating lever. Thus, the operating lever, with its cam surface, is, in the depressed state, clamped against the engagement face provided on the closing rod. To open the outlet opening, the user positions his or her thumb below the operating lever and can easily lift the operating lever, thereby turning the locking cam face in a releasing position. This movement thus releases the downward force on the closing rod, thereby allowing the spring member to become relaxed and thus move the closing rod back to its original open position As an alternative, the cam may be so shaped that no self-locking of the closing rod in the depressed state occurs: that is, the tensioned spring moves the closing rod into the open position as soon as the manual depressing force is removed from the operating lever.

Each of the two positions of the operating lever, and thus the position of the closing rod, are easily recognizable to thus unequivocally indicate to the user whether the outlet opening is open or closed.

According to a preferred embodiment of the invention, the engagement face is provided on an arm which is integrally molded to the closing rod and which has an end portion that is downwardly angled and contains an integrally molded pin on the side facing the operating lever. When the operating lever is in the closed position, the pin projects into an opening in the operating lever.

It is possible to have the pin clearly distinguishable from the remaining color scheme of the operating lever and from the arm which is molded to the closing rod. This allows it to be clearly recognizable in the closed position of the operating lever, thus providing an additional visual recognition that the outlet opening is closed.

DESCRIPTION OF THE PREFERRED EMBODIMENT

Figure 1:
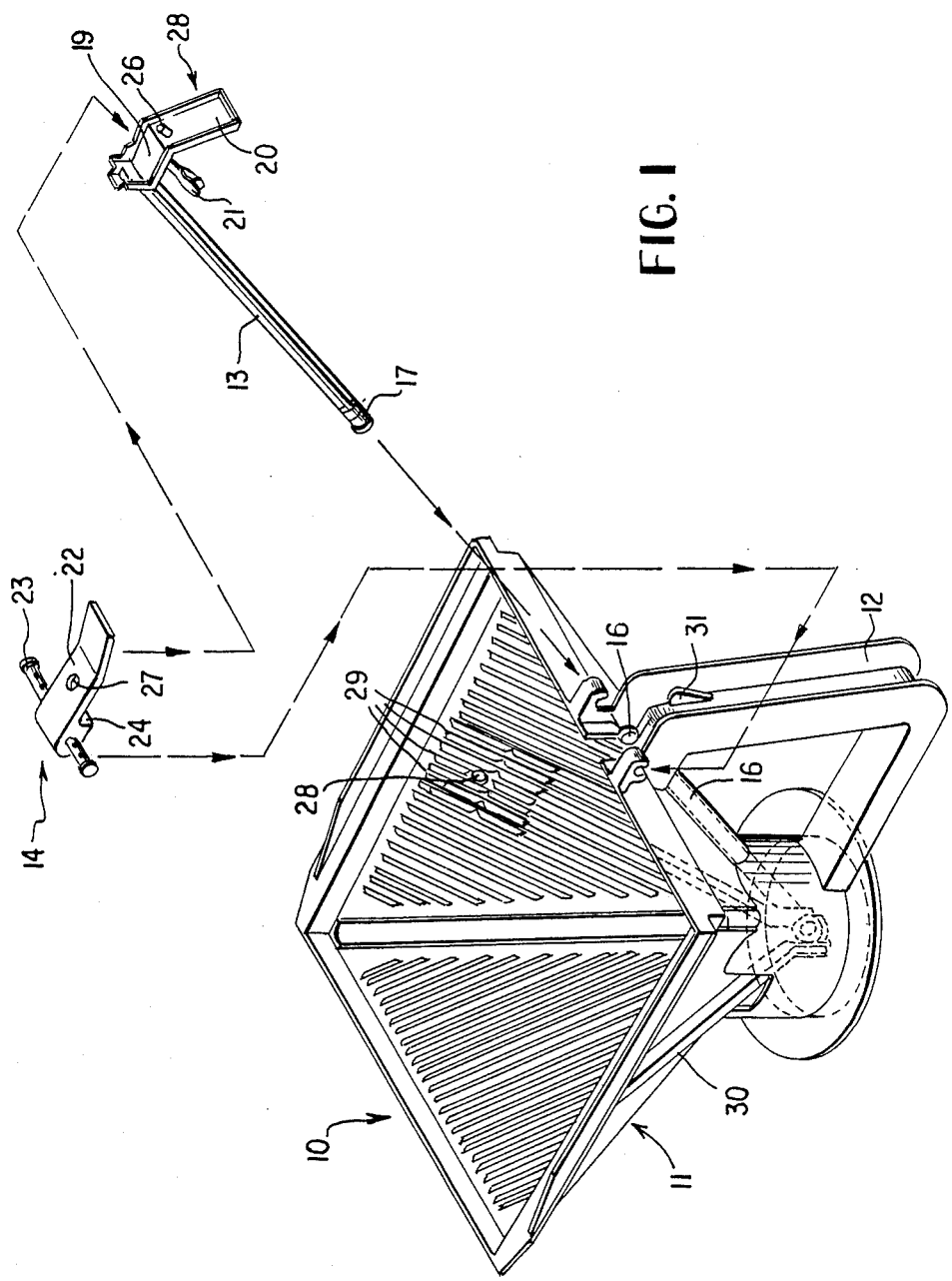
FIG. 1 is an exploded perspective view of the filter vessel according to a preferred embodiment of the present invention.

The filter vessel, which is shown in the drawings and is generally labeled reference numeral 10, is intended for extraction of aromas from coffee or tea and is produced from synthetic material.

As shown in FIG. 1, the filter vessel 10 comprises an essentially inverted pyramid-shaped vessel housing or vessel body 11 which includes an integrally molded carrying handle 12 and a two-element valve closing device which allows the outlet opening 15 in the filter vessel 10 to be opened or closed. One element of the valve closing device comprises a closing rod 13 and the other element is an operating device 14.

Figure 2:
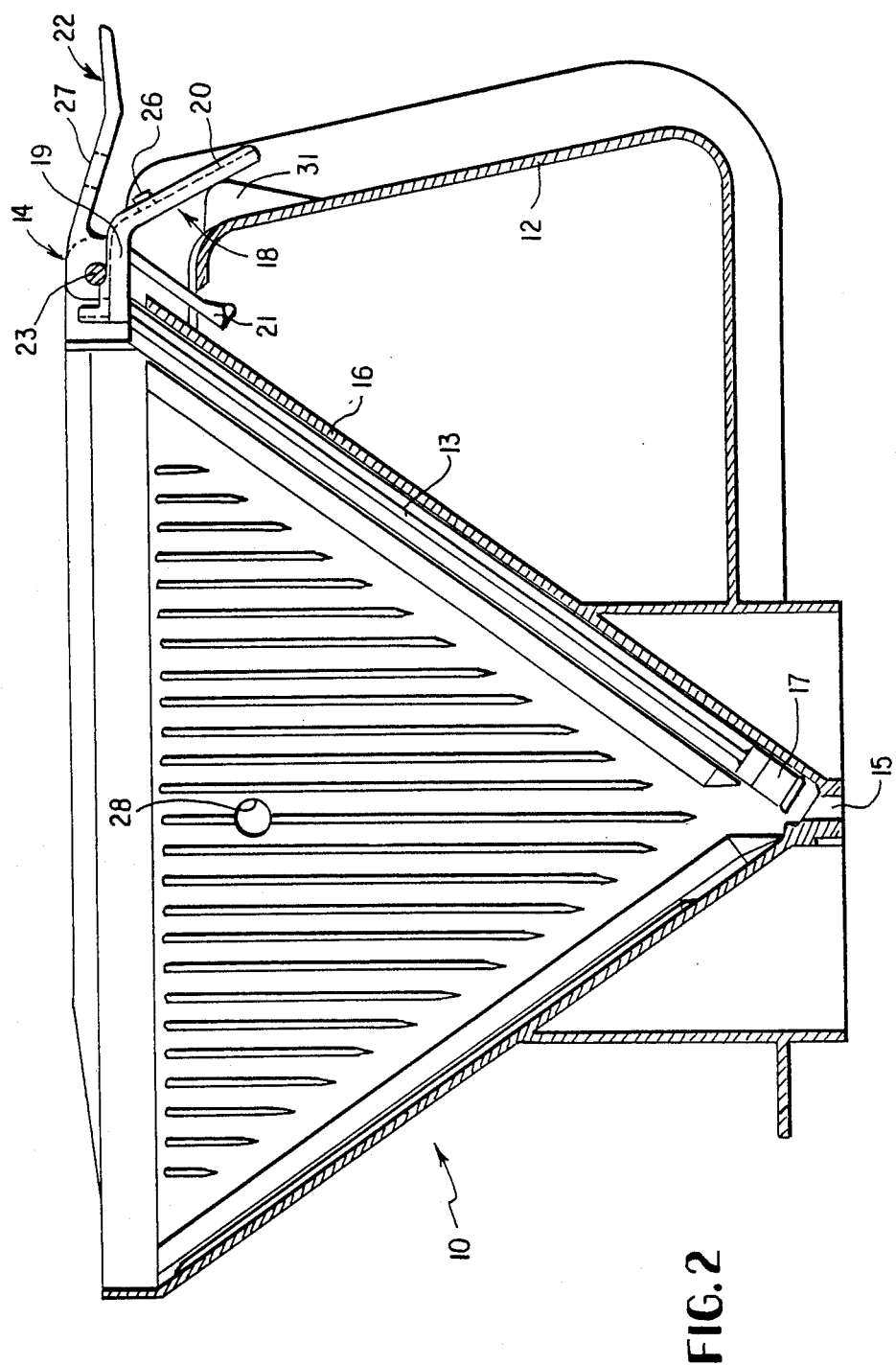
FIG. 2 is a sectional side elevational view of the filter vessel according to FIG. 1 showing a valve closing device in the open position.
Figure 3:
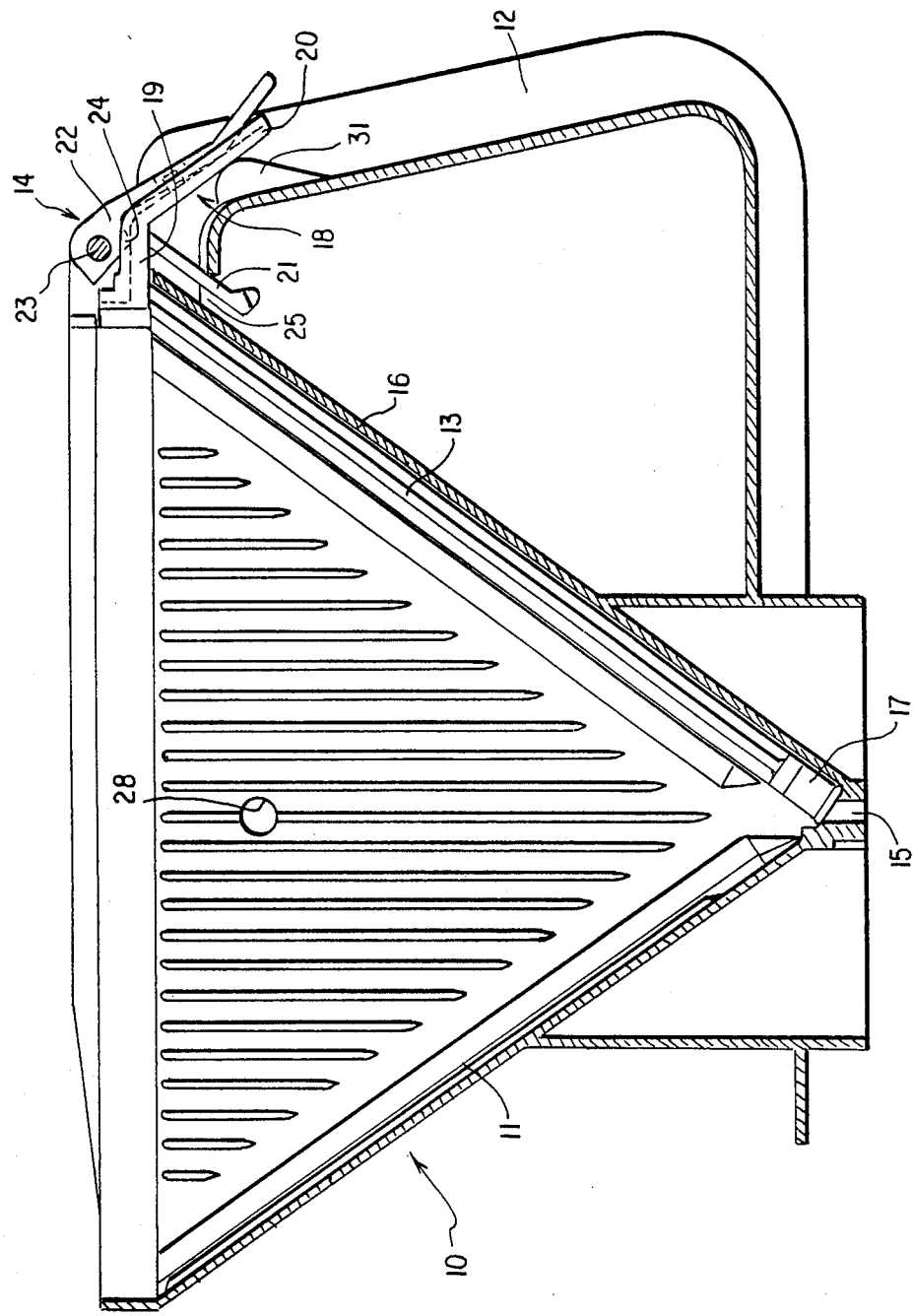
FIG. 3 is a sectional side elevational view corresponding to that of FIG. 2 showing the valve closing device in the closed position.

As FIGS. 2 and 3 particularly show, the closing rod 13 is guided in a groove 16 which is part of the interior wall of the housing 11. At its lower end, the closing rod 13 is equipped with a closing plug 17 that is preferably made of soft rubber and that cooperates with the outlet opening 15.

At the upper end of the closing rod 13 which extends beyond the highest part of the integrally molded carrying handle 12, is an arm 18 that is molded to the closing rod 13. The arm 18 comprises a section 19 immediately adjacent to the closing rod 13 and an end region 20 angled downwardly opposite this section 19. The section 19, as will become apparent later, constitutes an engagement face.

The underface of the arm section 20 abuts a lug (abutment) 31 formed on the carrying handle 12, and a spring member 21 is molded to the underside of section 19 and extends parallel to the longitudinal axis of the closing rod 13.

The operating device 14 comprises an operating lever 22 which is pivotal about a pivot axis 23 that is located parallel to the upper edge of the housing 11.

At the underside facing the arm 18, the operating lever 22 is equipped with a clamping cam 24 positioned above the section 19. The clamping cam 24 acts on the upper surface of the section 19 of the arm 18, when the operating lever 22 is depressed by the user's thumb. During such an occurrence, the clamping cam 24 presses down on the arm 18 so that the latter, together with the closing rod 13, is moved downward, whereby that the closing plug 17 positions itself over the outlet opening 15 of the vessel 11 and thereby closes the outlet opening 15.

In the closed position, as shown in FIG. 3, the arm portion 20, by virtue of the earlier downward movement of the closing rod 13 and the abutting relationship with the lug 31, is resiliently deformed (that is, the angle between the arm portions 19 and 20 is increased), this being resiliently resisted by the spring member 21 as it is forced against an edge defining the opening 25. This dual resilient deformation generates a force oriented parallel to the closing rod 13 and urging the same into the open position. If, in the fully depressed state of the operating lever 22 manual pressure is removed therefrom, the operating lever 22 remains in this position by virtue of the locking effect of the flat surface of the clamping 24, as shown in FIG. 3.

To place the valve mechanism in the open position, the user, by his/her thumb, engages the operating lever 22 from below and pushes it upwardly from the position shown in FIG. 3, overcoming the locking force which has maintained the valve in its closed position by virtue of the flat surface of the clamping cam 24. The forces of the resiliently deformed arm portion 20 and the spring member 21 are now free to move the arm 18 as well as the closing rod 13 upwardly, thereby opening the outlet opening 15.

As an alternative, the cam 24 may lack the flat surface portion providing for the self-locking effect; in such a modification the resilient forces move the closing rod 13 into the open position of FIG. 2 as soon as the manual depressing force is removed form the operating lever 22.

The arm 18 has an integrally molded pin 26 located on the surface of the end region 20 that faces the operating lever 22. The pin 26 is positioned so that it can project into an opening 27 in the operating lever 22 when the latter is in the closed position. If the pin 26 has a sufficient length, it may extend completely through the opening 27. The front end of the pin 26 can be distinguished from the color scheme of the other components so that, when the operating lever 22 is in the closed position, the possibility of an additional visual verification of the open or closed position is provided.

Figure 4:
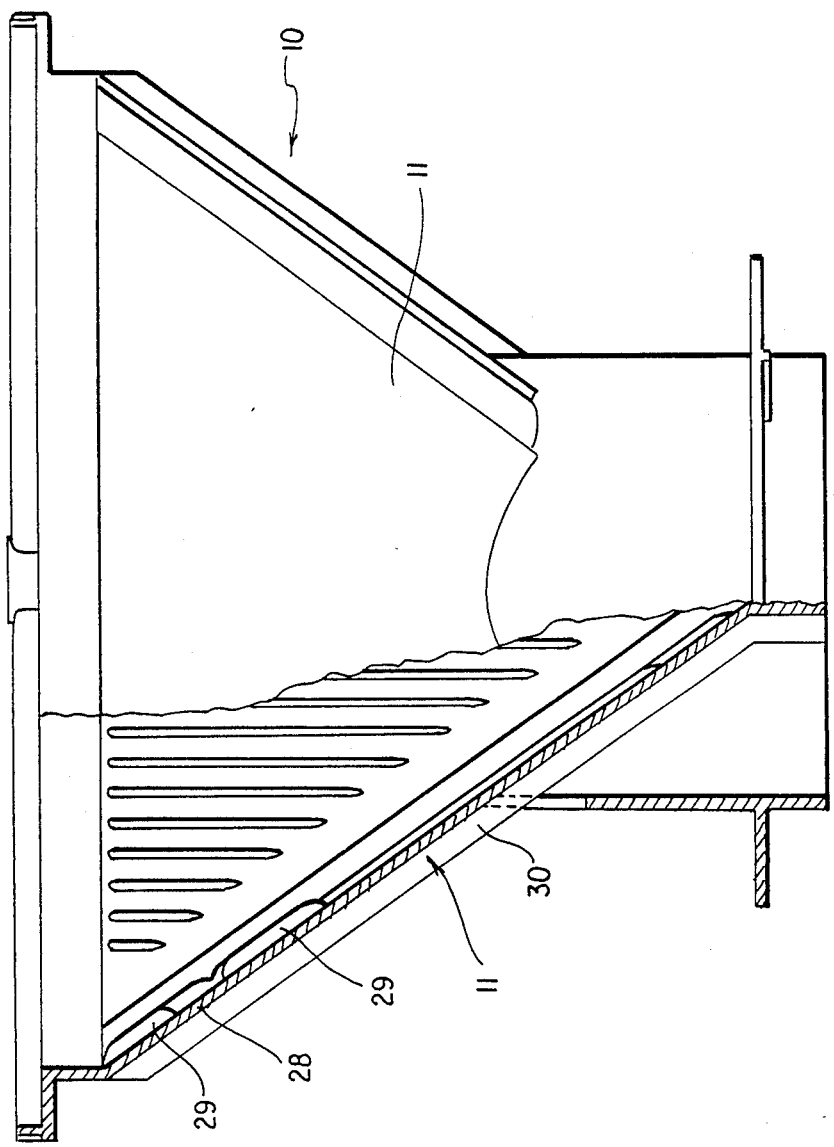
FIG. 4 is a sectional front elevational view of the filter vessel according to the preferred embodiment.

Also referring to FIG. 4, the housing 11 is equipped in its upper portion with over-flow openings 28 in the region of raised ribs 29 which project into the interior of the housing 11. The ribs 29 prevent the overflow-openings 28 from accidentally being closed by a filter that has been inserted into the vessel 10. The overflow openings 28 extend through the housing 11 and open on the exterior of the vessel into guide channels 30 which lead to the region of the outlet opening 15 of the vessel.

The purpose of the overflow-openings 28 and the guide channels 30 is to prevent uncontrolled overflow of the vessel 11, even if the user forgets to open the outlet opening 15 by moving the operating lever 22 from its closed position when the vessel 11 is almost completely filled with hot water.

The present disclosure relates to the subject matter disclosed in Federal Republic of Germany Application No. G 87 12 709.1 filed Sept. 21st, 1987, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a filter vessel for making coffee or tea, including:
   a vessel body adapted to accommodate liquid therein;
   means defining an outlet opening in a bottom zone of said vessel body;
   a carrying handle mounted on the vessel body;
   an assembly for selectively opening or closing said outlet opening; said assembly including
      a closing rod extending alongside said vessel body and being longitudinally movably supported thereby between first and second positions;
      a valve means mounted on said closing rod for cooperating with said outlet opening; said valve means maintaining said outlet opening open in said first position of said closing rod and said valve means maintaining said outlet opening closed in said second position of said closing rod; and
      operating means arranged in an upper zone of said carrying handle and coupled to said closing rod for manually moving said closing rod into one of said position;
   the improvement comprising
   (a) spring means for urging said closing rod into said first position;
   (b) an operating lever pivotally supported by said vessel body in said upper zone of said carrying handle and having a depressed position and a raised position; said operating lever forming part of said operating means;
   (c) an arm formed on said closing rod and defining an engagement face; said arm extending below said operating lever and having a free terminal length portion adjoining said engagement face;

(d) a clamping cam carried by said operating lever; said clamping cam being in contact with said engagement face and displacing said engagement face and said closing rod towards said second position upon manual movement of said operating lever into said depressed position;

(e) an indicator pin affixed to said free terminal length portion and oriented towards said operating lever; and (f) a throughgoing aperture provided in said operating lever and being in alignment with said indicator pin; said indicator pin projecting into said throughgoing aperture in said depressed position of said operating lever.

2. A filter vessel according to claim 1, wherein said operating lever has a pivotal axis; said engagement face being oriented parallel to said pivotal axis.

3. A filter vessel according to claim 1, further comprising an abutment formed on said carrying handle; said free terminal length portion being in contact with and being resiliently deformed by said abutment when said closing rod is in said second position; said spring means including said free terminal length portion.

4. In a filter vessel for making coffee or tea, including:
a vessel body adapted to accommodate liquid therein; said vessel body including an upper region having an overflow opening;
means defining an outlet opening in a bottom zone of said vessel body;
a carrying handle mounted on the vessel body;
an assembly for selectively opening or closing said outlet opening; said assembly including
a closing rod extending alongside said vessel body and being longitudinally movably supported thereby between first and second positions;
a valve means mounted on said closing rod for cooperating with said outlet opening; said valve means maintaining said outlet opening open in said first position of said closing rod and said valve means maintaining said outlet opening closed in said second position of said closing rod; and
operating means arranged in an upper zone of said carrying handle and coupled to said closing rod for manually moving said closing rod into one of said positions;
the improvement comprising
(a) spring means for urging said closing rod into said first position;
(b) means defining an engagement face on said closing rod;
(c) an operating lever pivotally supported by said vessel body in said upper zone of said carrying handle and having a depressed position and a raised position; said operating lever forming part of said operating means;
(d) a clamping cam carried by said operating lever; said clamping cam being in contact with said engagement face and displacing said engagement face and said closing rod towards said second position upon manual movement of said operating lever into said depressed position; and
(e) a guide channel provided in an outer face of said vessel body; said guide channel extending from said overflow opening to a zone adjoining said outlet opening.

5. In a filter vessel for making coffee or tea, including:
a vessel body adapted to accommodate liquid therein;
means defining an outlet opening in a bottom zone of said vessel body;
a carrying handle mounted on the vessel body;
an assembly for selectively opening or closing said outlet opening; said assembly including
a closing rod extending alongside said vessel body and being longitudinally movably supported thereby between first and second positions;
a valve means mounted on said closing rod for cooperating with said outlet opening; said valve means maintaining said outlet opening open in said first position of said closing rod and said valve means maintaining said outlet opening closed in said second position of said closing rod; and
operating means arranged in an upper zone of said carrying handle and coupled to said closing rod for manually moving said closing rod into one of said positions;
the improvement comprising
(a) spring means for urging said closing rod into said first position;
(b) means defining an engagement face on said closing rod;
(c) an operating lever pivotally supported by said vessel body in said upper zone of said carrying handle and having a depressed position and a raised position; said operating lever forming part of said operating means;
(d) a clamping cam carried by said operating lever; said clamping cam being in contact with said engagement face and displacing said engagement face and said closing rod towards said second position upon manual movement of said operating lever into said depressed position; and
(e) a groove formed in said vessel body; said closing rod being longitudinally slidably received in said groove.

6. A filter vessel according to claim 5, wherein said vessel body includes an upper region having an overflow opening.

7. A filter vessel according to claim 6, further comprising ribs provided on and projecting from an inner surface of said vessel body adjacent said overflow opening.

8. A filter vessel according to claim 5, wherein said vessel body is generally funnel shaped.

9. A filter vessel according to claim 8, wherein said vessel body has the shape of an inserted pyramid.

10. In a filter vessel for making coffee or tea, including:
a vessel body adapted to accommodate liquid therein;
means defining an outlet opening in a bottom zone of said vessel body;
a carrying handle mounted on the vessel body;
an assembly for selectively opening or closing said outlet opening; said assembly including
a closing rod extending alongside said vessel body and being longitudinally movably supported thereby between first and second positions;
a valve means mounted on said closing rod for cooperating with said outlet opening; said valve means maintaining said outlet opening open in said first position of said closing rod and said valve means maintaining said outlet opening closed in said second position of said closing rod; and operating means arranged in an upper zone of said carrying handle and coupled to said closing rod for manually moving said closing rod into one of said positions;

the improvement comprising (a) spring means for urging said closing rod into said first position;
(b) means defining an engagement face on said closing rod;
(c) an operating lever pivotally supported by said vessel body in said upper zone of said carrying handle and having a depressed position and a raised position; said operating lever forming part of said operating means; and
(d) a clamping cam carried by said operating lever; said clamping cam being in contact with said engagement face and displacing said engagement face and said closing rod towards said second position upon manual movement of said operating lever into said depressed position; said clamping cam having a camming portion contacting said engagement face and arranged for self-locking said closing rod in said second position when said operating lever is in its said depressed position; said clamping cam forming part of said operating means.

* * * * *